Sept. 19, 1961 H. J. CARTER 3,000,478
CLUTCH-BRAKE MECHANISM
Filed July 16, 1959 6 Sheets-Sheet 2

INVENTOR
Horace J. Carter.
BY
ATTORNEY

INVENTOR
Horace J. Carter

Sept. 19, 1961     H. J. CARTER     3,000,478
CLUTCH-BRAKE MECHANISM

Filed July 16, 1959     6 Sheets-Sheet 4

INVENTOR
Horace J. Carter

BY

ATTORNEY

Sept. 19, 1961    H. J. CARTER    3,000,478
CLUTCH-BRAKE MECHANISM
Filed July 16, 1959    6 Sheets-Sheet 5
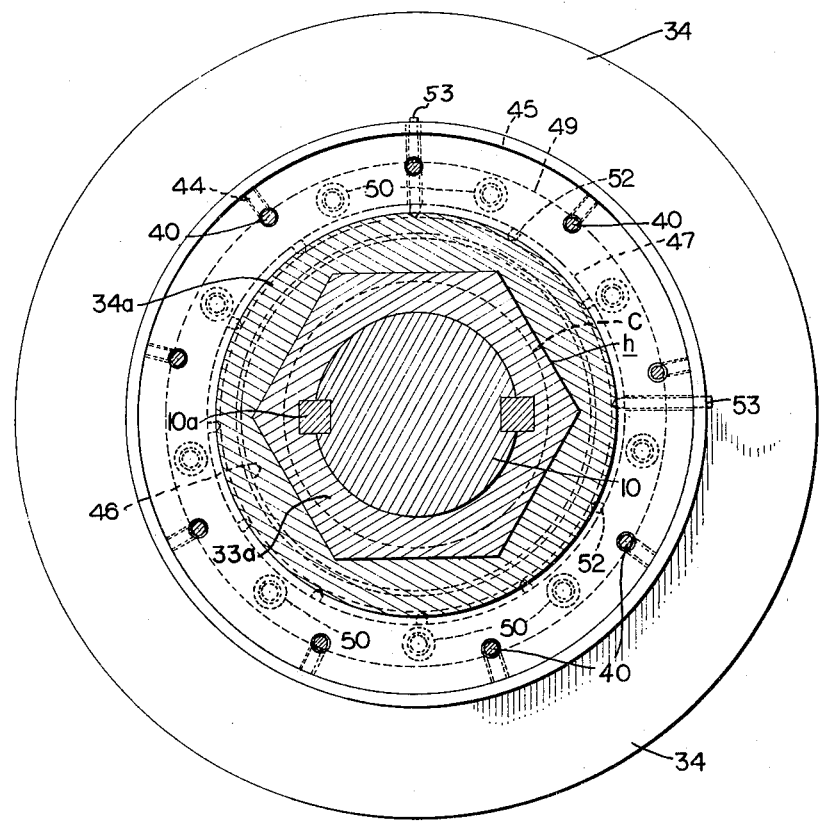
Fig. 5.
INVENTOR
Horace J. Carter
ATTORNEY Sept. 19, 1961  H. J. CARTER  3,000,478
CLUTCH-BRAKE MECHANISM
Filed July 16, 1959  6 Sheets-Sheet 6

INVENTOR
Horace J. Carter

BY *[signature]*

ATTORNEY

United States Patent Office 3,000,478
Patented Sept. 19, 1961

3,000,478
CLUTCH-BRAKE MECHANISM
Horace Johnson Carter, Wilmington, Del., assignor to Ferracute Machine Company, Bridgeton, N.J., a corporation of New Jersey
Filed July 16, 1959, Ser. No. 827,578
18 Claims. (Cl. 192—18)

This invention relates to an improved combined clutch-brake mechanism for starting and stopping machinery, particularly metal-working presses of varying tonnage or pressure capacity, and is adapted for either intermittent movement or continuous running of said machinery.

In a clutch-brake mechanism, where the clutch and the brake are disposed on opposite sides of a driving member, such as a flywheel or gear, the clutch and the brake have been interconnected—usually through the driving member—by a mechanical push-linkage which is moved to release the brake, by the engaging movement of the clutch, against a strong force normally urging the brake to applied position and, when the clutch is disengaged, the brake is applied, independently of the disengaging operation of the clutch, by its bias. In such an arrangement, nicety of adjustment is required between the push-linkage and the brake and between the clutch and brake friction surfaces to compensate for wear between said surfaces in order to prevent the clutch and brake being engaged or applied at the same time. When the maintenance of this adjustment is overlooked or unduly prolonged and the clutch and brake are applied at the same time, the mechanism may be severely damaged and/or injury occur to the operator or attendant. Moveover, during the engagement of the clutch and the releasement of the brake, an excessively heavy load or lateral force is imposed on said driving member which tends to tilt it on its bearings, and upon the retaining-nut, or other securing means, on the shaft. This load or force accelerates the wear or attrition of said bearings and of the setting of retaining and actuating parts thus requiring their replacement more frequently than should be normal; and this force also accelerates the wear of the contiguous contacting surfaces of parts on the shaft and causes the binding nut to loosen.

The primary object of this invention is to overcome the above stated drawbacks with an improved clutch-brake mechanism—having the driving member of the machine interposed therebetween and having an actuator to engage the clutch—whereby the actuator exerts a direct pull, as distinguished from a push, upon the clutch and the brake, during the engagement of the clutch and the release of the brake against its bias, without transfer of the lateral thrust load of this operation through or on the driving member or to its bearings.

Another object is the provision of a clutch-brake mechanism, arranged on opposite sides of a driving member for the clutch and having an actuator to engage the clutch and release the brake against its normal bias, wherein the pressure force generated by said actuator is dissipated or neutralized within the mechanism itself without transfer of said pressure force to the driving member, or to its bearings, or to a binding nut retaining said assembled mechanism on a shaft.

Another object of the invention is to provide an improved clutch-brake mechanism, in which the actuator, a shiftable brake part and a shiftable clutch part reciprocate in unison, as a unitary structure, in both directions so that the space—developed with full release of the brake—is equal to the travel of the shiftable clutch part to fully engage the clutch and, vice versa, the space traveled when disengaging the clutch is equal to the distance traveled by the shiftable brake part to apply the brake, whereby any wear of the frictional surfaces of the brake and/or the clutch requires only greater travel of the shiftable parts of the brake and/or the clutch, thus compensating automatically for the wear and, if the wear is too great, resulting only in an increased time lag or sluggishness of the mechanism until such time as nicety of adjustment is made to remove the sluggish operation of the mechanism or the worn surfaces are renewed.

A further object of the invention is the provision of a clutch-brake mechanism, having an improved and simplified construction requiring a minimum of maintenance, rendering greater access to the mechanism and which is more easily manufactured and at relatively less cost than similar mechanisms, and by which the wearable brake and clutch parts may be removed without disturbing other assembled parts of the mechanism and by which the entire assembled clutch-brake mechanism is held in place, or may be removed from operative position, on a shaft by one removable nut without disturbing any of the assembled parts of the mechanism.

A still further object is the provision of a clutch-brake maintained on an end of a shaft by a binding nut, and wherein access to said nut is permitted for tightening purposes without dismantlement of the clutch or the brake units.

The above mentioned objects, and others which will be apparent as this specification proceeds, are attained by and will be manifest from the following detailed construction of the present embodiment of the invention.

The invention resides in the novel features of construction and the combination and organization of parts hereinafter more fully described and more particularly pointed out in the appended claims.

In the drawings, which illustrate the invention in the embodiment in which it is at present devised:

FIGURE 5 is a transverse sectional view taken substantially on line 5—5 of FIG. 1;

FIGURE 7 is a fragmentary sectional view illustrating a modification whereby the clutch may be disconnected from the actuator of the mechanism; and FIGURE 8 is a fragmentary sectional view illustrating a modification whereby the brake may be disconnected from the actuator of the mechanism.

Figure 1:
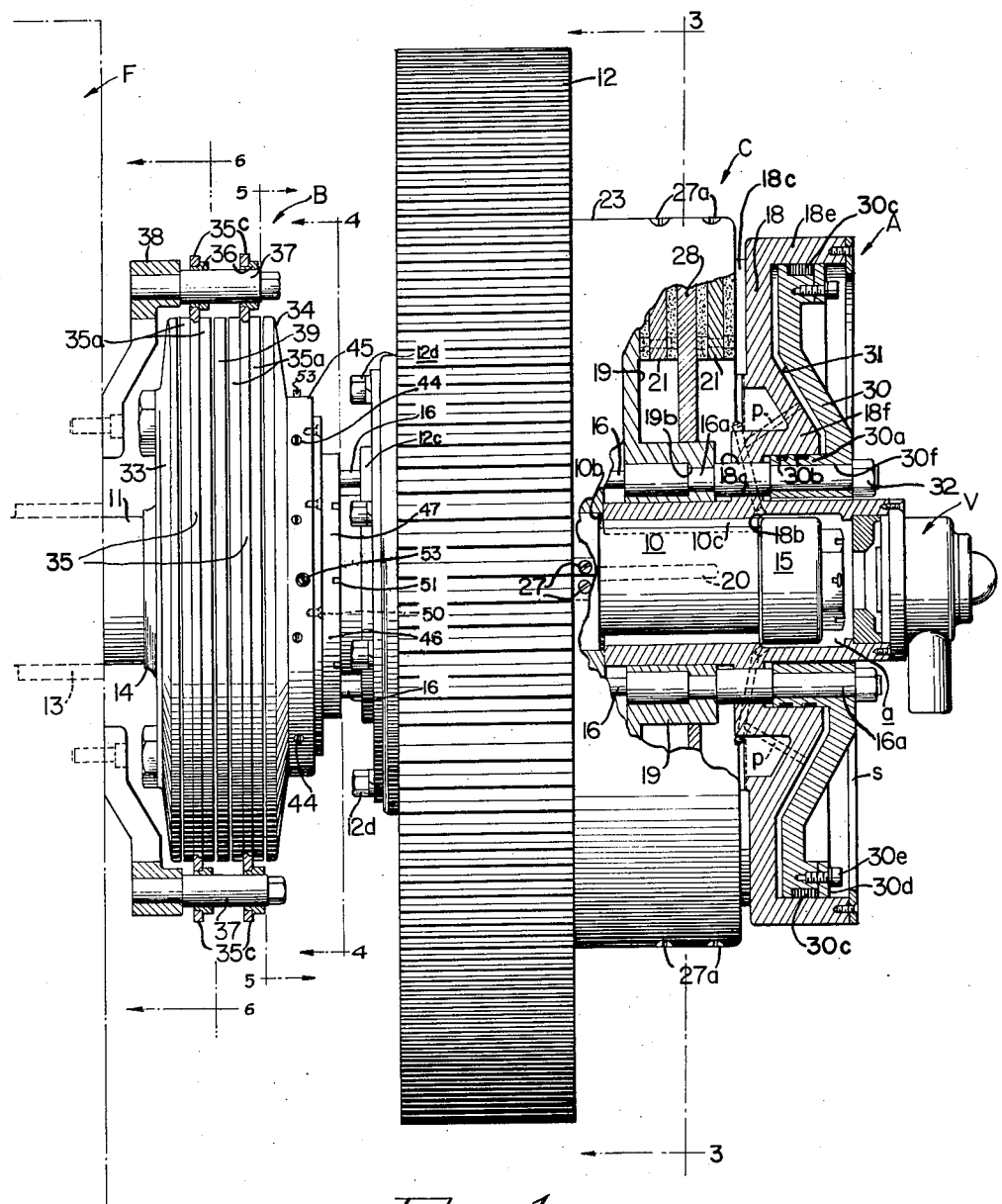
FIGURE 1 is an elevational view of the clutch-brake mechanism of this invention.

The clutch-brake mechanism C—B, shown in the drawings, is primarily adapted to be mounted upon an extended end 10 of a driven shaft 11 projecting horizontally from one side of a frame F of a metal-working press and upon which a driving member 12, such as a flywheel or driving gear, is journalled. The shaft 11 may be a crank shaft or other driven shaft of a press or other machinery. The clutch C, brake B and driving member 12, arranged preferably as shown, require no overhanging supporting bracket therefor, reduce the "overhang" of the machinery outwardly of the flywheel or driving gear 12 and permit of a better balance of the flywheel or driving gear 12 and of the brake and clutch instrumentalities on a projecting end 10 of a shaft resulting in a reduction in the vibration or shuddering of the shaft. The brake B, by being positioned inboard of the driving member 12 and being fastened directly to the outside surface of the press crown or press frame provides better stability of the mechanism and better brake action; and the clutch C, by being positioned outboard of the driving member 12 and having its driving parts fastened thereto, renders the brake B and clutch C readily accessible for adjustment and repairs and spaces the clutch and the brake so that ambient air has better access to them for cooling purposes. While the above disposition of the brake B and clutch C, shown and described herein, is preferred, they may be otherwise disposed or located with respect to driving and driven members of a press, or of other machinery, to which this clutch-brake mechanism C—B is applicable.

Referring in detail to the drawings, the shaft 11, which is the driven member of the clutch-brake mechanism, is journalled in a suitable bearing 13 at the crown or head portion of a press frame F. The shaft 11 is formed with an annular shoulder 14 positioned adjacent and outwardly of the bearing 13 and its extended end portion 10 projects outwardly beyond the shoulder 14 and upon which the brake B, the driving member 12 and the clutch C are mounted and held thereon by a nut 15 threaded on the end of the shaft-extension 10 and which nut binds their hub portions in end-to-end contact against the shoulder 14, thus holding the clutch-brake flywheel assembly on the shaft.

Figure 2:
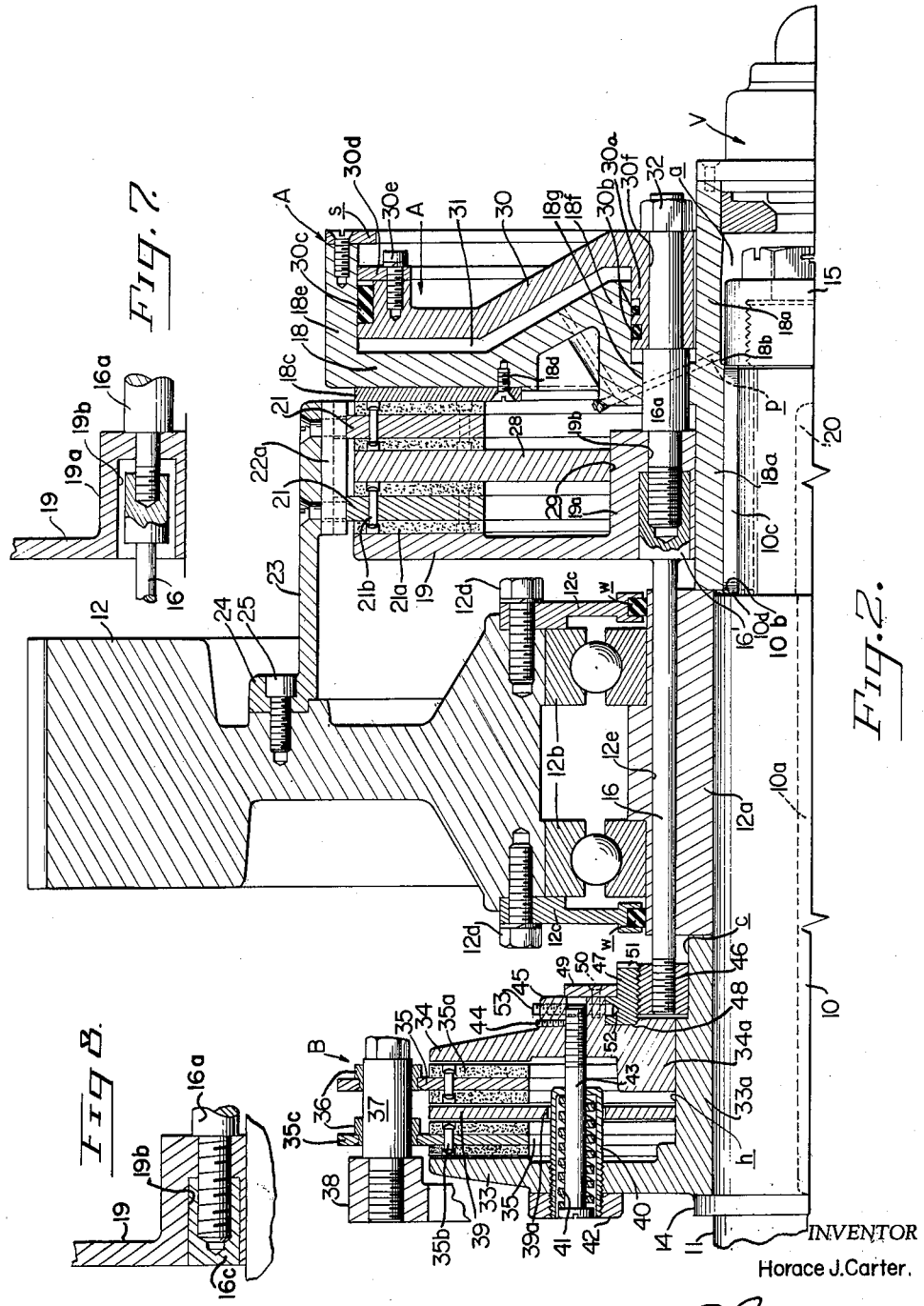
FIGURE 2 is an enlarged vertical sectional view taken longitudinally through the upper half of FIG. 1.

The flywheel 12, being the driving member of the assembly, may be of a belt-pulley type or a gear-wheel and is mounted on the intermediate portion of the shaft-extension 10 by means of a hub-collar 12a keyed at 10a to the shaft 10 and upon and about which the hub of the flywheel 12 is rotatably journalled by means of suitable anti-frictional bearings 12b (see FIG. 2). Annular discs or plates 12c project from each side of the hub of the flywheel 12 to the hub-collar 12a and are removably held in place by screws 12d to hold the outer races of the bearings 12b in place, the inner circumferences of said plates being channelled, or otherwise formed, to hold and retain packing w in wiping contact with outer circumferential end portions of the hub-collar 12a. The hub-collar 12a is provided with a plurality of parallel and circumferentially spaced bores or passages 12e extending longitudinally through the annular wall, forming the hub-collar 12a, each of said passages 12e having slidably mounted therein a pull-rod 16 which connects the brake B with the clutch C and its actuator A.

The clutch C, which is disposed on the side of the flywheel 12 opposite to that of the brake B and, preferably, on the outboard side of said flywheel, comprises a fixed annular clutch plate 18 positioned on the outboard side of the clutch assembly and is formed with an elongated tubular hub 18a, which extends a distance beyond both sides of said plate 18 for the purposes now to be described. As shown particularly in FIGS. 2 and 3, one, or the inboard, end portion of the hub 18a surrounds a reduced portion of the shaft extension 10, which forms a shoulder 10b, and is keyed to said shaft extension 10 by key 10c. A cooperating shiftable annular clutch plate 19 is formed with a hub 19a which surrounds and is slidably keyed, as at 20 in FIGS. 1 and 3, on the outer circumference of said inboard hub-end 18a. The other, or outboard, end portion of the hub 18a has a greater interior diameter than its other end portion to provide a shoulder 18b against which the binding nut 15, on the extremity of the shaft 10, will bear to hold the clutch-brake assembly in place on said shaft. It will be observed that the hub 18a does not abut the shoulder 10b on the shaft extension 10 and is spaced therefrom to receive a packing 10d, but does abut the hub-collar 12a of the flywheel 12 which overlies the packing 10d, when the nut 15 is in its binding position. The inner side face of the fixed clutch plate 18 has mounted concentrically thereon an annular wear-plate 18c, which is held in place by screws and dowel pins 18d, and is positioned to oppose a shiftable driving clutch-disc 21 interposed between the clutch plates 18 and 19.

Figure 3:
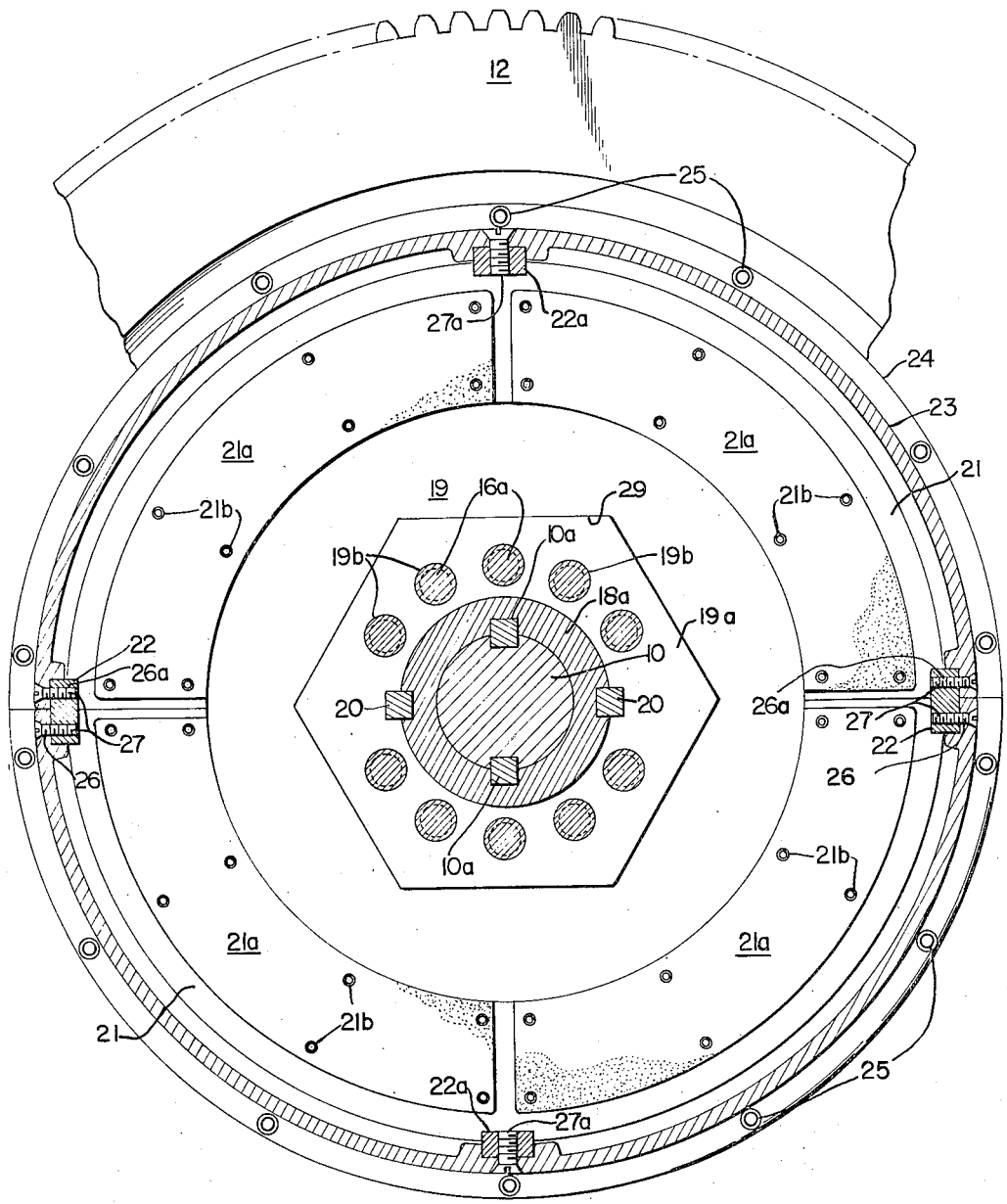
FIGURE 3 is a transverse sectional view taken substantially on line 3—3 of FIG. 1.

There may be one or more of these driving discs 21, according to the size and capacity of the clutch desired, and, as shown in FIG. 3, each comprises, preferably, two semi-circular segments notched at the end corners and at a mid-point of their outer peripheral edges to fittedly straddle and slide upon keys 22 and 22a, respectively, extending transversely thereof and carried on the inner surface of a sleeve-like casing 23 which has one end flanged, as at 24, through which screws 25 secure the casing to the flywheel. The sleeve-like casing 23 is likewise composed of two semi-circular segments of 180° each (see FIGS. 1 and 3). Each meeting edge of the casing segments is provided with a row of screw openings 26 and the keys 22 (which are wider than the keys 22a) are likewise provided with two rows of screw openings 26a to align with the openings 26, when the meeting edges of the clutch casing are in meeting position, for receiving the screws 27 that hold the segments of the casing together and the keys 22 in position. Likewise, the keys 22a are similarly held in position by a single row of screws 27a extending through the casing and threaded into said keys 22a. The segments of each clutch driving disc 21 are arranged in the same plane and are slidably shiftable on the keys 22 and 22a during the operational movements of the clutch. The opposing faces of the segments of the driving discs 21 are faced with a frictional lining material 21a held in place thereon by countersunk rivets 21b in the customary manner.

When more than one driving discs 21 are employed in the clutch, as shown in FIGS. 1 and 2, one or more seat rings 28 are provided between two adjacent clutch discs 21 and each has a hexagon-shaped inner circumference slidably fitted on the outer circumference of the hub 19a of the shiftable clutch plate 19, which outer circumference of the hub 19a is complementally shaped to receive the hexagon opening 29 in the ring or rings 28, thus preventing independent rotation of the rings 28 relative to the slidable clutch plate 19 (see FIG. 3).

The clutch actuator A (shown in FIGS. 1 and 2) is a fluid (preferably air) actuated piston which pulls through a positive connection—in contra-distinction from pushes—all the shiftable parts of the clutch-brake mechanism C—B to engage the clutch and release the brake against its bias. To this end, use is made of the fixed clutch plate 18 to provide a cylinder-chamber in which the piston 30 reciprocates axially of the shaft 10. This is accomplished by forming the clutch plate 18, at its outer circumferential edge portion, with a lateral and downwardly extending annular flange 18e radially aligned and concentric with the outboard end portion of the hub 18a, which together with said flange 18e, form an annular cylinder-chamber 31 in which the piston 30 is disposed to cooperatively oppose the adjacent side face of the plate 18. The piston 30 is an annular disc-like member formed with a central hub 30a, which surrounds the outboard hub portion 18a of the fixed clutch plate 18 with a sliding fit. An inner portion of the fixed clutch plate 18, adjacent the piston hub 30a, is off-set toward the piston, as indicated at 18f, and surrounds the piston hub 30a in slidable engagement therewith. Packing rings 30b are retained in suitable grooves in the piston hub 30a to provide seals between the surfaces of said off-set portion 18f of the fixed clutch plate 18 and the hub 30a of the piston. The outer peripheral edge of the annular disc-like piston 30 is rabbetted to contain a packing 30c in sealing cooperation with the flange 18e; and a removable ring 30d closes said rabbet on the outer side of the piston 30 and is removably held in place by screws 30e. A piston stop-ring s may be provided at the end of the flange 18e.

Figure 4:
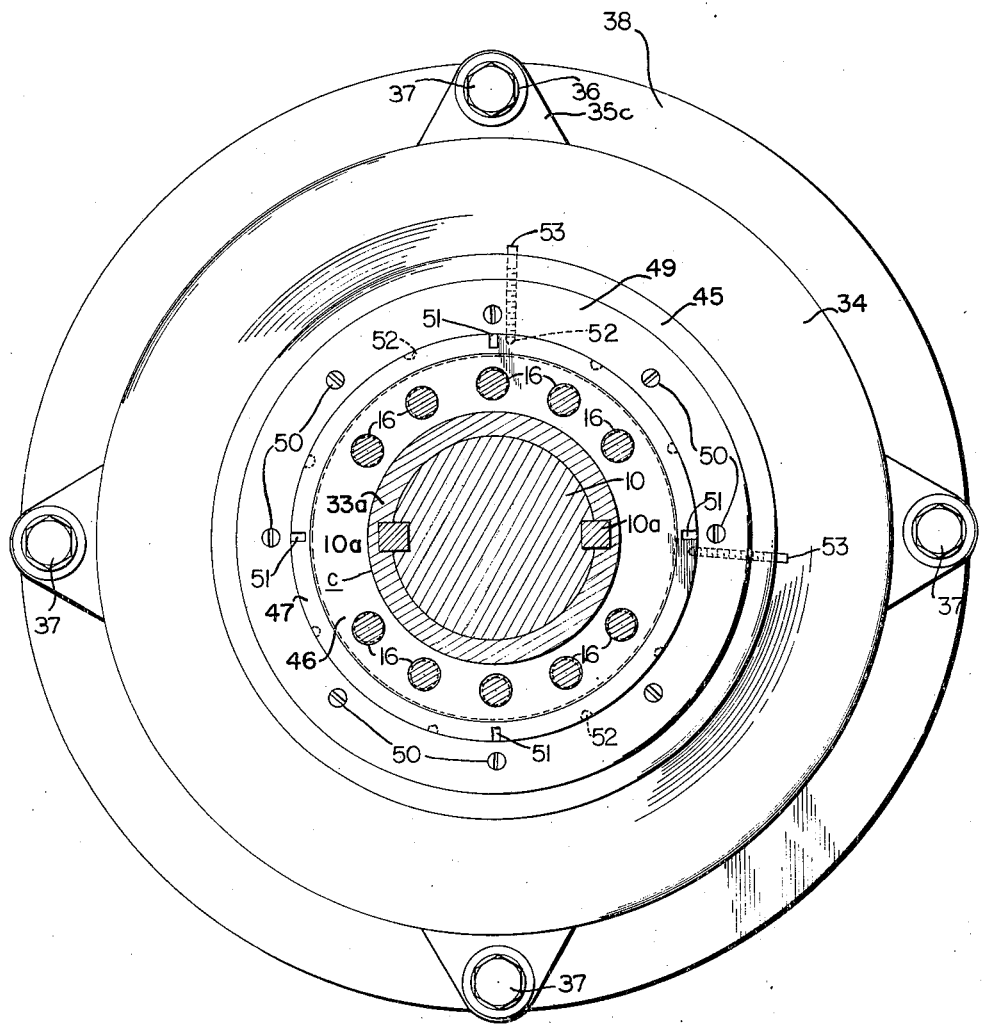
FIGURE 4 is a transverse sectional view taken substantially on line 4—4 of FIG. 1.

The shiftable clutch plate hub 19a, the fixed clutch plate 18 and the piston hub 30a are bored, or otherwise formed, to provide aligned axial guide passages 19b, 18g and 30f, respectively, in the same number and circumferential spacing as are the passages 12e in the hub-collar 12a of the flywheel 12 to align with the passage 12e. A connecting rod 16a extends through each set of these aligned passages 19b, 18g and 30f and detachably connects the piston 30 to an aligned pull-rod 16 slidably disposed in the hub-collar 12a, there being about ten of these aligned passages and sets of connecting rods as shown in FIGS. 3 and 4. The connecting rods 16a have reduced end portions formed with threaded extremities, the larger central portions being slidably mounted in the passages 18g of the fixed clutch plate 18. One end portion of the rod 16a extends through a passage 30f in the piston hub 30a and a nut 32 securely binds the piston hub 30a against the adjacent shoulder on the rod 16a. The other reduced end portion of the rods 16a may be connected to the hub 19a of the shiftable clutch plate 19 in any suitable manner that provides a positive and rigid connection therewith and with the aligned rods 16 in the flywheel hub-collar 12a. It is preferred, as shown, that the adjacent ends of the rods 16 be each formed with an internally threaded sleeve-like socket 16' which extends fittedly into an enlarged end of the passage 19b and which socket threadedly receives the adjacent threaded extremity of a rod 16a, whereby the hub 19a of the shiftable clutch plate 19 is firmly, but detachably, clamped between the end of the socket 16' and the adjacent shoulder on the rod 16a.

As previously stated, the pull-rods 16 and 16a serve as a connecting link between the piston 30, the shiftable clutch plate 19 and a shiftable part of the brake B. The construction of the brake and its connection with the pull-rods will now be explained.

Figure 6:
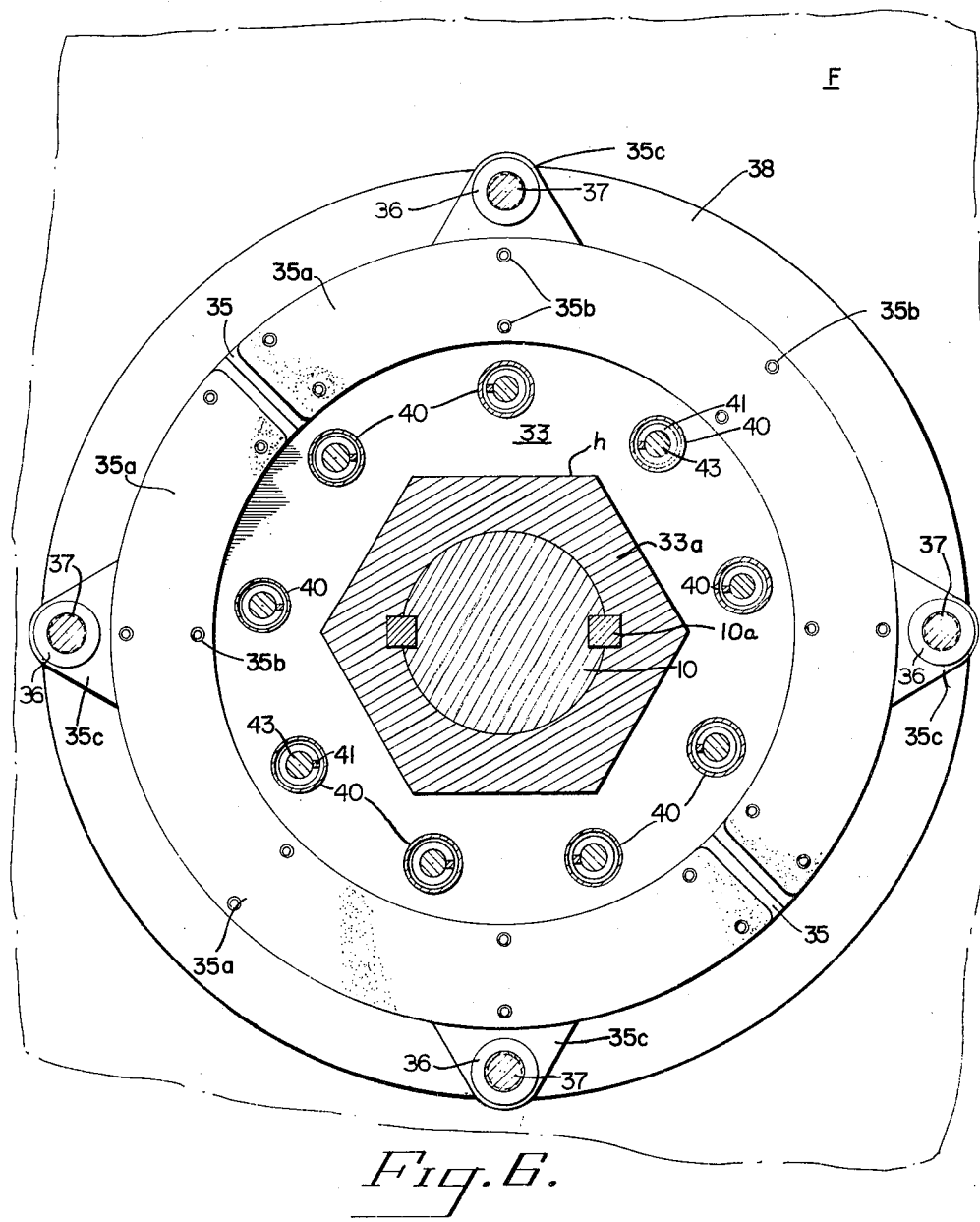
FIGURE 6 is a transverse sectional view taken substantially on line 6—6 of FIG. 1.

The brake B comprises a rigid annular plate 33 arranged to be at the end of the brake-clutch assembly and is provided with an elongated hub portion 33a extending inwardly of the clutch-brake assembly and which is made fast on the shaft-extension 10 by the keys 10a and has its end portions held in abutting engagement with the shoulder 14 on the shaft 11 and the flywheel hub-collar 12a by the nut 15. The outer periphery of the hub portion 33a, adjacent the plate 33, is hexagon in shape for a major portion of its length, as at h and as shown in FIGS. 2, 5 and 6. The remainder of the length of the hub portion 33a, from the hexagon surface to its free end, is reduced in diameter to form an external cylindrical surface c. An annular shiftable brake plate 34 has a hub portion 34a formed with an inner hexagon periphery complemental to and slidably fitted on the hexagon surface h of the hub 33a to prevent independent rotation of the shiftable brake plate 34.

Interposed between the brake plates 33 and 34 are one or more annular brake discs 35, each of which is composed of two semi-circular separate segments which, when assembled, complete a circle and lie in the same plane; and the opposite surfaces of these segments are faced with a frictional lining material 35a in the usual manner. Each brake disc segment has outer marginal portions 35c projecting beyond the outer peripheries of the brake plates 33 and 34. These marginal portions 35c are formed with a plurality of spaced openings having bushings 36 fitted and peened therein, the spacing of these bushings on the brake disc being such as to permit each of them to receive and be slidably mounted upon one of a plurality of horizontal supporting studs 37 threaded into and laterally projecting from a brake supporting ring 38 which is rigidly mounted to the side frame F of the machine or press, thus providing a non-rotating mounting for the non-rotating brake discs 35 while permitting them to slide axially on the studs 37. By this construction, the brake discs can be readily removed for relining or replacement by removal of the studs 37 and withdrawing the separate segments, and, conversely, by reinserting new segments and replacing the studs 37. When more than one brake disc 35 are employed, as shown, the opposing surfaces of adjacent brake discs are separated by a plate-like seating ring 39 whose inner periphery is hexagon in shape to complement and to slide axially upon the hexagon surface h of the hub 33a, thus rotating with the latter.

The shiftable brake plate 34 is normally biased or urged to move toward the fixed brake plate 33 and thereby binds the brake discs 35 between them (and the separating seat plate 39 when employed), thereby normally applying the brake. This is accomplished in this construction by providing a plurality of threaded openings in the fixed brake plate 33 inwardly of its effective braking face, into each of which openings is threaded an elongated cylindrical socketed-retainer 40 for housing and retaining helical compression springs 41. These retainers 40 extend inwardly of the brake mechanism through enlarged openings 39a in the brake disc seat plates 39 and have their bottom ends terminating considerably short of the shiftable brake plate 34 to allow for the full reciprocal movement of said latter plate. Each of the retainers 40 are locked in place at their opening end portions by lock nuts 42 threaded on the ends thereof and bearing against the rigid brake plate 33. As shown particularly in FIGS. 5 and 6, there are nine of these retainers 40 and their springs 41 equally spaced around the fixed brake plate 33, but this number may be increased or diminished according to the size and capacity of the brake employed. A headed bolt 43 extends through each of the springs 41, respectively, and through an opening in the bottom of its retainer 40 and has its threaded end threaded into an opening in the shiftable brake plate 34, thereby holding each of the springs under compression between the bottom of the socketed-retainer 40 and the head of the bolt 43. The retainers 40 are of sufficient length to allow for the required movements of the shiftable brake plate 34 while the heads of the bolts 43 are readily accessible for adjustment to increase or diminish the compression tension of the springs 41. Each of the bolts 43 is locked in adjusted position by a set-screw 44 threaded in a lateral boss 45 provided on the outer face of the shiftable brake plate 34 (see FIGS. 1, 2 and 5).

The shiftable brake plate 34 is shifted against the bias of the springs 41 to release the brake by the pull-rod connections 16—16a, of which rods 16 are threadedly connected at their inboard ends with a pull-ring 46 which surrounds and is slidable axially on the cylindrical reduced portion c of the hub 33a of the fixed plate 33. The outer circumference of the ring 46 is threaded and is in threaded engagement with an internally threaded adjustment-ring 47 which is rotatably seated within a rabbet groove 48 in the inner circumference of the boss 45 and is held therein by an external retaining-ring 49 secured to the boss 45 by screws 50. An exposed end of the adjustment-ring 47 is provided with slots 51 for receiving a spanner wrench, whereby the adjustment-ring may be rotated in either direction of its rotation to vary the position of the pull-ring 46 and thereby vary the spacing between the shiftable clutch plate 19 and the shiftable brake plate 34 to compensate for wear that may occur on the friction surfaces 21a of the clutch and 35a of the brake, in order to obtain that nicety of adjustment which results in spontaneous operation of the clutch-brake mechanism.

In order to lock the adjustment-ring 47 in adjusted positions, the outer circumference of the ring 47, underlying the boss 45 on the shiftable brake plate 34, is formed with a circumferential series of spaced holes or depressions 52 which may be brought to register with the dog-point of one or more set-screws 53 radially threaded in the boss 45. These holes 52 may be spaced so as to permit about a .005 inch adjustment, to be made of the pull-ring 46, between each setting of adjacent holes 52. As shown in FIG. 4, the set-screw 53 may be headless and be within the outside diameter of boss 45. Other types of detent means may be provided instead of the set-screws 53 to cooperate with the holes 52.

In the operation of the clutch-brake mechanism, according to this invention, air, under pressure, is supplied to the cylinder-chamber 31 in any suitable manner to actuate the piston 30, but it is preferred to employ a rotor-sealed exhaust valve assembly V which is removably fitted to and closes the outboard end of the hub 18a of the fixed clutch plate 18 (see FIGS 1 and 2) and through which the air is admitted to and exhausted from said hub space *a* at the end of the shaft-extension 10. The valve assembly V is shown and described in copending application Serial No. 694,359, filed November 4, 1957 which has matured into United States Patent No. 2,954,010. The cylinder-chamber 31 communicates with the space *a* in the hub 18a through a plurality of radially and equally spaced passages *p* drilled in the fixed clutch plate 18, there being four of such passages provided in the plate 18 shown therein although the number of these passages *p* may vary.

The air pressure, entering the cylinder-chamber 31 through passages *p*, moves the piston 30 outwardly, as shown in FIG. 2—i.e. to the right in FIGS. 1 and 2—and pulls the shiftable clutch plate 19 with it simultaneously to engage the clutch C and, at the same time, releases the brake B against the normal bias of compression springs 41; and, when the air pressure is cut off or relieved from the valve V (either manually or automatically by some operating mechanism of the press), the air in the cylinder-chamber 31 exhausts instantly through passages *p* and through the valve V; thereupon, the compression springs 41 disengage the clutch C and apply the brake B instantly. A minimum of movement is required to release or apply the brake and to engage or disengage the clutch while providing sufficient clearance to prevent drag on the friction surfaces of either the brake or clutch when fully released; and at the commencement of this travel distance, in any operation of the mechanism, the engaged device (clutch or brake) releases, first, sufficiently to prevent friction drag on its surfaces before the other device engages, while the time lapse for this travel distance is sufficiently short to provide almost simultaneous disengagement of one device and engagement of the other device. When, however, the frictional surfaces 21a of the clutch or the frictional surfaces 35a of the brake, or both, become worn by operational attrition, the clutch-brake mechanism will become only more sluggish without damage to said mechanism, or to the press, or to the attendant, who will then be warned by this sluggishness that a nice adjustment of the adjusting-ring 47 is needed or that the clutch discs 21 or the brake discs 35 need replacement.

It is pointed out that, by the construction and organization of parts of the clutch-mechanism according to this invention, the several disadvantages noted in the forepart of this specification are overcome. By having the hub 33a of the fixed brake plate, the hub-collar 12a of the flywheel bearing (with the pull-rods 16 passing therethrough inwardly of the anti-frictional bearing member 12b) and the hub 18a of the fixed clutch all keyed on the shaft 10 in contiguous abutting contact and held clamped between the shoulder 14 and the binding nut 15 on the shaft 10 and by having the fluid pressure actuator A constructed and positioned as shown and described, the thrust or force generated by the operation of the actuator A—i.e. to release the brake against its bias and to engage the clutch—is neutralized within the mechanism itself without being transmitted to the flywheel 12 or upon its bearings 12b. Since the pressure required to operate the actuator A reacts equally upon the fixed clutch plate 18 and the piston 30, that portion of this pressure exerted on the fixed clutch plate 18 is transmitted through the hub 18a of said plate, through the hub-collar 12a of the flywheel to the hub 33a of the fixed brake plate, which abuts the shoulder 14 on the shaft 10; and that portion of this pressure, which is exerted upon the piston 30, is transmitted through the pull-rods 16a—16, through the compression spring bolt-rod 43, through springs 41, spring housings 40 and the fixed brake plate 33 to its hub 33a, thus neutralizing (or substantially neutralizing) the pressure transmitted from the clutch plate 18. This results in the elimination of any axial thrust upon the flywheel and its anti-frictional bearing 12b from the operation of the piston 30—which thrust would tend to tilt the flywheel on its bearings—and, also, eliminates, or substantially eliminates, this pressure of this operating force from the binding nut 15.

From the above description, it should be clear that, among the many novel features of this invention, the following are manifest—(1) the piston 30 and the shiftable plates 19 and 34 of the clutch and of the brake, respectively, are all rigidly connected so that both the clutch and the brake reciprocate in unison and, as a consequence, the travel of one in its operation is equal to the travel of the other and in which neither the clutch nor the brake is operational without the other being non-operational; that (2) while the clutch and brake are on opposite sides of the flywheel 12, the operational functioning of the clutch-brake mechanism is accomplished without transferring its lateral thrust load to the flywheel or upon the anti-frictional bearings 12b of the flywheel; that (3) the pressures generated to release the brake and to apply the clutch neutralizes itself within the clutch-brake mechanism without being transmitted to the flywheel or to the binding nut 15; that (4) the construction provides ready and easy accessibility to the brake discs or shoes 35 without disturbing other parts of the brake assembly, by removing studs 37 and pulling the separate halves of the discs 35 from the brake and, conversely, slipping new disc-halves in place and replacing the studs 37; that (5) ready and easy accessibility is provided to the clutch discs or shoes 21 without disturbing other parts of the clutch assembly, by removing the screws 25 and one row of screws 27 on each side of the clutch casing 23 to separate the casing in halves and then pulling the clutch disc halves from the clutch and, conversely, then inserting new halves in place and replacing the casing on the flywheel; that (6) the clutch C, flywheel 12 and the brake B may be removed from the shaft 10 without dismantling any parts of the clutch C or of its piston actuator A, or removing the hub-collar 12a from the flywheel, or dismantling any parts of the brake B, by merely removing the valve V and the nut 15; that (7) the binding-nut 15 (or its equivalent) may be tightened without dismantling the actuator A or the clutch C, by merely removing the valve V; that (8) the clutch-brake mechanism C—B is very simple in construction, easy and relatively cheaper to manufacture and is assembled with great facility; that (9) the construction of this invention permits the non-use of the clutch C, in situations where that is desired or required, yet still retaining the brake operational by the removal of the shiftable clutch-plate 19, or by connecting the pull rod 16 directly with the rod 16a without the clamping connection provided by the enlarged socket 16' as shown in FIG. 7, by eliminating the clutch parts 19, 21 and 28, thus providing for the use of the brake B with a clutch of different design or differently located; and (10) that the present construction permits the brake to be rendered non-operational while retaining the clutch C, by disconnecting the pull-rods at 16' from the connecting rods 16a and from the adjustment-ring 47 and removing them, and, then, substituting an adapter-bushing 16c, shown in FIG. 8, in the portion of the guide-passage 19b to secure the rods 16a in the shiftable clutch plate 19, this arrangement requiring springs to be installed between the clutch plates to separate them, when the clutch is disengaged.

Having thus described the invention and the manner in which the same is to be performed and constructed, it is to be understood that changes and modifications may be made in detail construction of parts and in specific arrangement of parts shown and described and that such changes as fall within the scope of the appended claims are within the purview of the present invention and contemplated thereby.

That which is claimed, as new and to be secured by Letters Patent, is:

1. A combined clutch-brake mechanism comprising a driving member journalled about a shaft with the journal-bearing thereof having a hub-collar surrounding and rotatable with said shaft, a clutch means for connecting said driving member with said shaft and a brake means for stopping said shaft and each having a non-shiftable member formed with a hub portion and mounted on and rotatable with said shaft at opposite sides, respectively, of said hub-collar of said bearing and in end-to-end contact therewith, said brake means having a shiftable part mounted on the hub of said non-shiftable brake member, means reacting between said non-shiftable brake member and said shiftable brake part and positioned for normally biasing said shiftable part to move it relatively to said non-shiftable brake member in a direction away from said driving member to brake-applied position, said clutch means having a shiftable part mounted on the hub of and movable relatively to said non-shiftable clutch member in a direction away from said driving member to engage said clutch means, a fluid-pressure actuator carried by said non-shiftable clutch member and including an actuator member actuated by said fluid-pressure in a direction axially of and away from said driving member to engage said clutch means, and connection means positively connecting said actuator member and said shiftable part of clutch means and said shiftable part of said brake means and whereby, when said actuator member is actuated by fluid pressure, the shiftable brake part is moved against its bias to release said brake means and the shiftable clutch part is moved to engage the clutch means and a portion of said pressure exerted upon said actuator member is transmitted through said connecting means to the hub of said non-shiftable brake member and the portion of said pressure exerted upon the non-shiftable clutch member is transmitted through its hub and the hub-collar of said driving member to the hub of said non-shiftable brake plate, thus neutralizing the pressures exerted upon said fluid-pressure actuator within the clutch-brake mechanism itself without exerting a lateral thrust load on said driving member.

2. A combined clutch-brake mechanism comprising a driven shaft, a driving member including a bearing therefor journalled on the shaft, said bearing having an inner hub-collar portion fixed on said shaft; a frictional brake means mounted on the shaft at one side of said driving member and including a brake-plate fixed to the shaft and a second brake-plate shiftable axially relative to the shaft and normally biased to move in a direction away from said driving means and toward said fixed brake-plate to braking position; a frictional clutch means mounted on the shaft at the other side of and driven by said driving member and including a clutch-plate fixed on the shaft and a second clutch-plate shiftable axially relative to the shaft and positioned to move in a direction away from said driving member and toward said fixed clutch-plate to clutch-engaging position; a fluid pressure actuated means incorporated within and rotatable with a portion of said fixed clutch-plate and movable in a direction away from said driving member to engage the clutch means; and pull-rods slidably mounted in and extending through axial guide-passages in said hub-collar of said bearing and rigidly connected at one end with the shiftable clutch-plate and with said actuated means and at their other ends with said shiftable brake-plate, whereby the shiftable plates of the clutch means and of the brake means are operated in unison with a pulling force against the bias of the shiftable brake-plate to release the brake means and to engage the clutch means, when said actuated means is operated by fluid pressure, and are operated by the bias of the shiftable brake-plate to disengage the clutch means and apply the brake means when said fluid pressure is relieved from said fluid pressure actuated means.

3. A combined clutch-brake mechanism as set forth in claim 2 wherein the portion of the shiftable brake-plate, to which said pull-rods are rigidly connected, is a rotatable collar member surrounding said shaft and threading into a ring revolvably mounted on and carried by said shiftable brake-plate, whereby adjustment may be made between shiftable brake and clutch plates to compensate for wear of the friction surfaces of said brake and clutch plates, and means for releasably locking said revolvable ring in its adjusted positions.

4. A combined clutch-brake mechanism as set forth in claim 2 wherein the outer face of the fixed clutch-plate is provided with lateral outwardly-extending concentric and radially spaced flanges forming an annular cylinder chamber therebetween, and wherein the fluid pressure actuated means is an annular piston slidably mounted in said chamber, and wherein there are ducts in said fixed clutch-plate communicating the space in said chamber between said piston and said clutch-plate with a controlled source of fluid pressure supply.

5. A combined clutch-brake mechanism as set forth in claim 2 wherein said shaft is provided with a threaded end and with an abutment shoulder remote from its threaded end, and said fixed plates of said brake and clutch are formed with elongated inwardly extending hubs keyed to said shaft, the outer end of the hub of the fixed brake-plate abutting the shoulder on the shaft and its inner end abutting the hub-collar of the bearing of said driving member and the inner end of the hub of the fixed clutch-plate abutting the other end of said hub-collar of said bearing, and a nut threaded on said end of said shaft and abutting against the outer end portion of said fixed clutch-plate and firmly and releasably holding said hub portions in abutting relation and against the shoulder on said shaft, whereby the entire clutch-brake mechanism may be slid off the shaft by removing said nut and without disturbing or dismantling the clutch-brake mechanism.

6. The subject matter of claim 5, wherein the outer end portion of the hub-bore of the fixed clutch-plate is of larger diameter than its inner end portion to form a shoulder abutment against which said nut bears and to provide a fluid passage between the shaft and the said hub, and wherein there are ducts in said fixed clutch-plate communicating said fluid passage with said fluid pressure actuated means, and wherein there is an inlet and exhaust valve mechanism positioned across the outer end of the hub of said fixed clutch-plate to close the same and removably secured thereto.

7. A combined clutch-brake mechanism as set forth in claim 2 wherein said fixed plates of said brake means and clutch means are formed with elongated hubs extending inwardly toward said driving member, the outer perimeters of said hubs being polygonal and the shiftable plates of said brake means and clutch means are formed with complemental central openings therethrough to fittedly receive said hubs, respectively, and upon which said plates are slidably and non-rotatably mounted.

8. A combined clutch-brake mechanism as set forth in claim 1, wherein the clutch means includes a sleeve-like casing surrounding said clutch plates and removably secured at one end to the adjacent side of said driving member, said casing being composed of at least two axially extending and axially separable sections, and clutch-discs each comprising separate segments disposed substantially concentrically between said clutch-plates and about said shaft, at least one of said disc-segments being disposed in each separable casing section and disposed in planar alignment with a complemental segment in each of the other of said casing sections and slidably splined to its adjacent section for rotation therewith and for shiftable movement axially of said casing, whereby the clutch-discs may be removed and replaced by separating the casing sections without disturbing any other part of said clutch-brake mechanism.

9. In a combined clutch-brake mechanism, a rotatable driving member for said mechanism, a brake having a shiftable member normally biased to braking position, a frictional clutch disposed at one side of said driving member and having a clutch-plate adapted to be fixed to the shaft and a second clutch-plate mounted for shiftable movement axially relative to and for rotation with the fixed clutch-plate, clutch-discs disposed between said clutch-plates and mounted on the driving member to rotate therewith, a fluid-pressure actuated means for engaging the clutch and mounted at the outer side of said fixed clutch-plate and rotatable therewith and including a piston, and rods connected to said piston and slidably extending through said fixed clutch-plate and connected with the shiftable clutch-plate and connected to the shiftable member of said brake, whereby the clutch and the brake may be actuated in unison against the bias of the shiftable brake-plate to release the brake and engage the clutch, when said piston is operated by fluid pressure, and actuated by the bias of the shiftable brake member to disengage the clutch and apply the brake, when said fluid pressure is relieved from said actuated means.

10. A combined clutch-brake mechanism comprising a shaft; a rotatable driving-member and a journal bearing therefor having a hub-collar fast on said shaft; a brake means and a clutch means disposed, respectively, on opposite sides of said driving-member and each including a plate having a hub portion fixed to said shaft and in abutting contact with the adjacent ends of the hub-collar of the bearing of said driving member, means on the said shaft removably holding said hub portions in said relationship, said brake means and said clutch means each having shiftable parts therein mounted for movement to release the brake means and to engage said clutch means, respectively; an annular cylinder disposed on and axially about the outer face of said fixed clutch plate; an annular piston fitted slidably within said cylinder and providing a pressure chamber between it and said outer face of said fixed clutch plate; rods extending slidably through said fixed clutch plate and said hub-collar of the driving member bearing and connected to said piston, to said shiftable clutch part and to said shiftable brake part; means normally biasing the brake means to applied position; and fluid pressure passage means communicating with said pressure chamber of said cylinder, whereby the pressure admitted in said chamber reacts upon said piston and said fixed clutch plate and that pressure, exerted on said piston, is transmitted through said rods inwardly remote from the bearing surfaces of the driving member to the hub of said fixed brake plate and that pressure, exerted on said fixed clutch plate, is transmitted through its hub and the hub-collar of said driving member to the hub of said fixed brake plate where the divided pressure is neutralized.

11. In a combined clutch-brake assembly, a driven shaft, a driving member journalled on said shaft, a brake mechanism and a clutch mechanism disposed, respectively, on opposite sides of said driving member and operatively mounted on said shaft with the driving parts of the clutch mechanism connected to said driving member, said clutch and said brake mechanisms each having shiftable parts mounted for movement in a direction away from the driving member to engage the clutch mechanism and to apply the brake mechanism, respectively; fluid pressure actuated means disposed in the assembly and mounted to actuate the clutch mechanism to engaged position, when activated; means normally urging the shiftable parts of the brake mechanism to applied position; and a pull-connection between and connected to a shiftable part of the clutch mechanism and a shiftable part of the brake mechanism to pull the shiftable brake part against its bias, when the clutch mechanism is operated to engagement, and to pull the shiftable clutch part to disengage the clutch mechanism, when the brake mechanism is applied by its bias, said pull-connection extending between said shiftable parts axially of the shaft.

12. A combined clutch-brake mechanism comprising a clutch assembly adapted to be mounted axially on a shaft for engaging and disengaging driving and driven members and having a clutch-plate fixable on the shaft, a brake assembly adapted to be mounted axially on said shaft for stopping the driven member and having a brake-plate fixable on said shaft, said assemblies each including a shiftable plate disposed between the fixable plates of said assemblies in cooperative association with their respective fixable plates, a fluid pressure actuated means including a piston mounted and arranged to actuate said clutch assembly to engaged position, when activated by fluid pressure, a pull-means positively connecting said piston with said shiftable plates of said clutch assembly and of said brake assembly, and means normally biasing said shiftable brake-plate toward its cooperating fixable brake-plate, whereby the shiftable clutch and brake plates may be pulled in tandem and unison against the bias of the shiftable brake-plate to release the brake assembly and engage the clutch assembly, when said piston is operated by fluid pressure, and will be pulled in tandem and unison in the opposite direction by said biasing means to disengage the clutch assembly and apply the brake assembly, when said fluid pressure is relieved from said fluid pressure actuating means.

13. The subject-matter of claim 12 further characterized by the fixable clutch-plate having an elongated tubular hub to surround the end portion of said shaft and said fluid pressure actuating means surrounding said hub, the bore in the outer end portion of said hub being of greater diameter than said shaft to form an internal shoulder abutment adapted to be engaged by a nut threadable on the end of said shaft, whereby the entire clutch-brake mechanism may be slid off the shaft by removing said nut and without disturbing or dismantling said mechanism.

14. The subject-matter of claim 12 further characterized by the shiftable brake-plate having a connection with said pull-means which is adjustable axially of said shiftable brake-plate, and means positioned externally of said connection for accessibly effecting said adjustment, whereby a single adjustment may be made to compensate for wear of the friction surfaces of the brake and of the clutch assemblies.

15. The subject-matter of claim 12 further characterized by the fixable brake plate having an elongated hub projecting from one side thereof adapted to be keyed to a shaft and terminating in a cylindrical end portion, said shiftable brake plate being slidably mounted on the intermediate portion of said hub and rotatable therewith, at least one brake disc positioned between said brake plates and, an internally threaded adjustment ring carried by and revolvably mounted and retained on the outer face of said shiftable brake plate and surrounding and spaced from the cylindrical end portion of said hub, an externally threaded collar journalled on said cylindrical end of said hub and within said adjustment ring and in threaded engagement with said adjustment ring, and said pull-means being connected with said collar, whereby adjustment for wear between the friction surfaces of the clutch and brake assemblies may be made.

16. The subject-matter of claim 12 further characterized by the fluid-pressure actuated means comprising an annular cylinder disposed on and axially of and about the outer face of said fixed clutch plate and said piston being annular and fitted within said cylinder and providing a pressure chamber between it and said outer face of said fixable clutch plate, an inner circumferential portion of said piston lying inwardly beyond said pressure chamber, and said pull-means being rods extending from said inner circumferential portion of the piston and rigidly connecting said piston with said shiftable plates of said clutch assembly and brake assembly.

17. The subject-matter of claim 12 further characterized by the fixable clutch plate having a hub projecting axially thereof beyond the sides of said plate, the inner portion of said plate adjacent said hub being offset in spaced relation to one projecting end of said hub and providing an annular space about and axially elongated relative to said end of the hub, an annular flange projecting laterally outward from the outer periphery of said plate and surrounding said hub end of said clutch plate in spaced relation to said offset portion to provide an annular cylinder, said piston being annular and slidably mounted in said cylinder and having a hub portion projecting into the space between said hub of said plate and said offset portions of said plate, said shiftable clutch plate being slidably keyed on the other projecting hub-end of said fixable clutch plate, and said pull-means being rods extending slidably through said shiftable clutch plate and detachably connected to the hub of said piston and to said shiftable clutch and brake plates.

18. A combined clutch-brake assembly as set forth in claim 11, wherein there is a single adjustment in said pull-connection to extend or contract the pull-connection for adjusting said shiftable parts of the brake mechanism and of the clutch mechanism simultaneously relative to each other.

References Cited in the file of this patent

UNITED STATES PATENTS

| | | |
|---|---|---|
| 1,254,951 | Ward | Jan. 29, 1918 |
| 2,274,213 | Pratt et al. | Feb. 24, 1942 |
| 2,375,566 | Lipps | May 8, 1945 |
| 2,422,713 | Benson | June 24, 1947 |
| 2,428,336 | Munschauer | Sept. 30, 1947 |
| 2,441,543 | Longfield | May 11, 1948 |
| 2,516,966 | DuBois | Aug. 1, 1950 |
| 2,645,320 | Thompson | July 14, 1953 |
| 2,767,817 | Davis | Oct. 23, 1956 |
| 2,838,150 | Eason | June 10, 1958 |
| 2,862,589 | Porteous et al. | Dec. 2, 1958 |
| 2,913,081 | Rudisch | Nov. 17, 1959 |